United States Patent Office 2,875,804
Patented Mar. 3, 1959

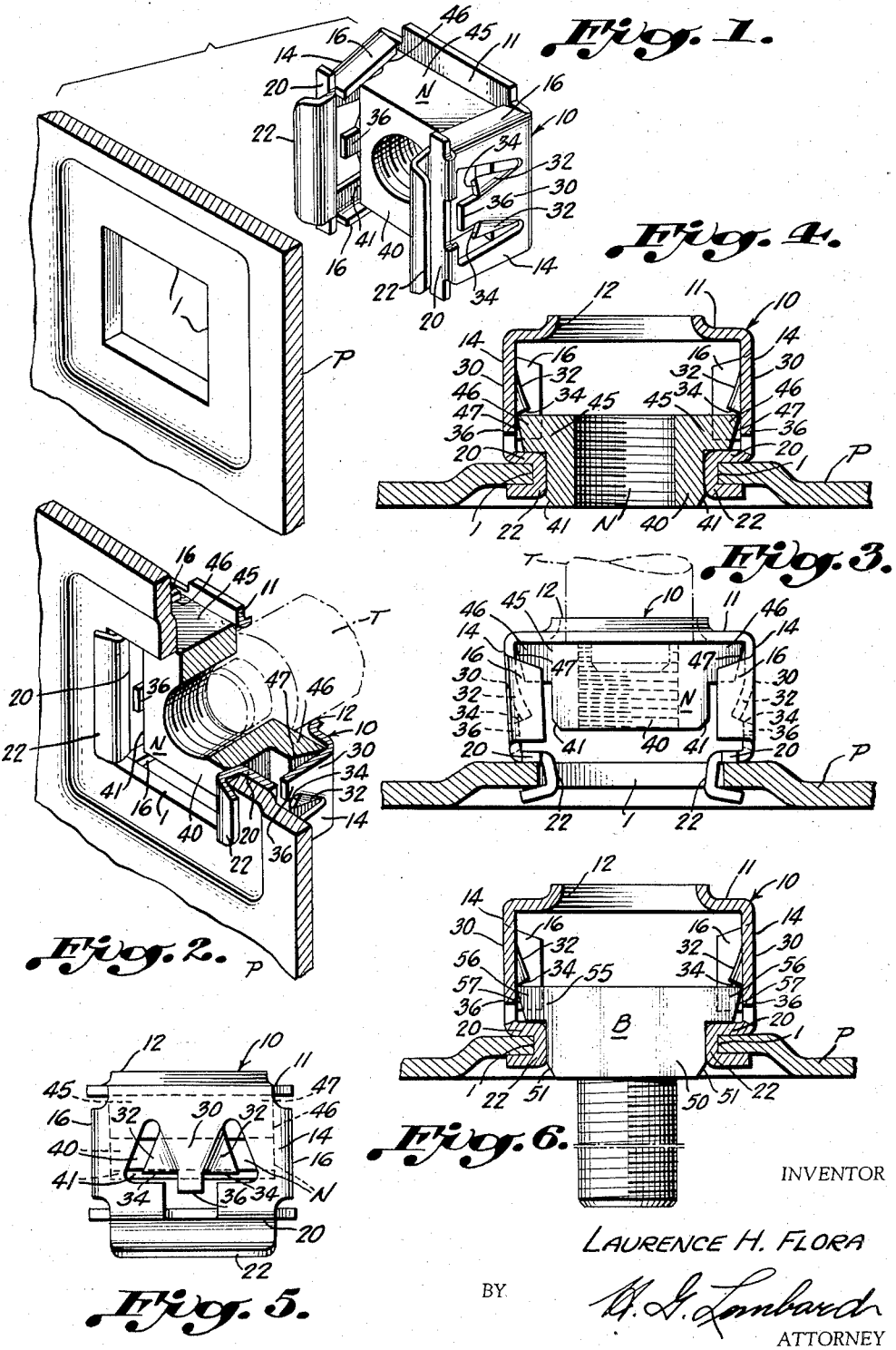

2,875,804

NUT AND HOLDER INCLUDING TONGUES TO MAINTAIN NUT IN POSITION

Laurence H. Flora, Cleveland, Ohio, assignor to Tinnerman Products, Inc., Cleveland, Ohio, a corporation of Ohio Application October 13, 1953, Serial No. 385,834

7 Claims. (Cl. 151—41.75)

This invention relates in general to bolt and nut fastened installations and deals, more particularly, with improvements in fastening devices for attaching a nut or bolt in fastening position in an installation prior to the application of the cooperating bolt or nut thereto for securing the parts of the installation.

In many assemblies, it is necessary or desirable to use a standard nut and bolt fastening device but it is usually a difficult problem, especially in blind locations, for the operator to hold the bolt or nut in place as the cooperating fastener is applied thereto, or otherwise, to maintain the same against relative rotation during the final tightening of the fasteners. In such an assembly in which the rearward side of a part is not conveniently or readily accessible for holding a bolt or nut in fastening position prior to the application of the cooperating fastener, it has been the practice to resort to various forms of cage devices requiring a welding or riveting operation for attaching the same in providing means for holding the nut or bolt in fastening position. A welding or riveting opperation requires inordinate time for attachment of the fasteners and, otherwise, involves considerably increased costs in manufacture which often make the use of this type of holder prohibitive in many installations requiring a cheap and inexpensive fastening means.

In United States Patent Number 2,391,046 issued December 18, 1945, there is disclosed a general form of nut holder which is installed in attached position on a support by an easy clip or snap fastening procedure that is much quicker and considerably cheaper than that involved in the use of the aforementioned cage devices requiring a costly and time consuming riveting or welding operation. In the use of nut holders constructed in accordance with this patent, it has been found in applications wherein a power driver is employed to apply a bolt into a previously attached nut, that the impact of the power driver in the initial application of the bolt to the nut occasionally causes a displacement of the nut and nut holder from proper attached position. In accordance with the present invention, such nut holders and bolt holders are so constructed as to provide a positive permanent lock of the holder and the nut or bolt retained thereby in attached position and capable of withstanding such impact of a power driver or other force that might have a tendency to displace the nut or bolt from proper and effective attached position.

A primary object of this invention, therefore, is to provide a holder or retainer for a nut or bolt head or other work clamping member, which comprises clip or snap fastened attaching means in the form of spring arms or hooks which are received in a work opening in the attached position of the holder, and which are adapted to be positively retained in such attached position by manipulation of the nut or bolt head to expand said spring arms into anchored relation in the work opening in the attached position of the holder and the nut or bolt head retained thereby.

A further object of the invention is to provide such a holder for a nut or bolt head in which the attaching arms or hooks extend completely free from the body of the holder for easy and quick application to attached position by a simple clip or snap fastening action, and which are adapted to be positively retained in attached position by manipulation of the nut or bolt head to expand said spring arms into anchored relation in the work opening together with locking means engaging the nut or bolt head and preventing displacement of the nut or bolt head from attached fastening position.

Another object of the invention is to provide a holder for a nut or bolt head, as described, in which the locking means engaging the nut or bolt head are provided on the arms of the holder and define shoulders adapted for positive abutting relation with the nut or bolt head in attached position in a manner whereby the nut or bolt head is retained against displacement from attached fastening position.

Further objects and advantages, and other new and useful features in the construction, arrangement and general combination of elements of the improved fastening device of the invention will be readily apparent as the following description proceeds with reference to the accompanying drawings, for purposes of illustration but not of limitation, in which like reference characters designate like parts throughout, and in which:

Fig. 1 is a perspective view showing an assembled nut and nut holder in accordance with the invention in position to be attached in a work opening in a supporting plate or panel, or the like;

Fig. 2 is a fragmentary perspective view showing the assembled nut and nut holder of Fig. 1 as initially attached in the work opening and with a tool applied to the nut to manipulate the same to fastening position;

Fig. 3 is a sectional view through the supporting part showing the assembled nut and nut holder in side elevation as initially attached in the work opening, and with the tool applied to the nut to manipulate the same to fastening position;

Fig. 4 is a vertical sectional view showing the nut as manipulated by the tool to its applied fastening position in which the locking means on the holder engage the nut to lock the same against displacement in such fastening position; and, Fig. 5 is an end elevational view of the fastener unit comprising the assembled nut and nut holder shown in Figs. 1–4 inclusive.

Fig. 6 is a sectional view similar to Fig. 4 showing the same holder as employed for retaining a bolt in applied fastening position.

Referring now, more particularly, to the drawings, Figs. 1–5, inclusive, show a fastening device in accordance with the invention as provided for use as a holder or retainer 10 for a nut N. The holder 10 is constructed from a sheet metal section of a size and configuration determined by the shape and size of the nut N with which it is to be used and may be readily provided for use with various other nuts or equivalent work clamping members such as the head of a bolt B, as illustrated in Fig. 6, for example.

In the present example, the holder 10 is shown as constructed for use with the threaded nut N to be attached in fastening position over a generally rectangular work opening 1 in a supporting part such as a panel or plate P which preferably is countersunk in the area of said opening 1, as shown, so that said panel P is adapted to seat in flush relation to the part to which it is to be secured. The holder 10 may be readily constructed for attachment in a circular hole or other opening of any selected design but the use of a generally rectangular work opening, as shown, is advantageous in that it is relatively simple to form and otherwise provides for a fixed nonrotative attachment of the nut and nut holder in attached position. Any suitable sheet metal may be employed for providing the nut holder 10, but preferably that of a spring metal nature such as spring steel or cold rolled steel having spring-like characteristics.

The sheet metal blank forming the holder 10 is bent to provide a base or body portion 11 having an enlarged bolt passage preferably defined by an annular outward flare 12, and end portions extending in the same general direction to form a pair of spring arms 14 or end walls substantially normal to said central body portion 11 at the opposite ends of said nut N. The spring arms 14 are provided with side tabs or lugs 16 extending inwardly toward each other at the opposite sides of said nut N, and the lower end portions of said spring arms 14 are bent to define inwardly extending bottom wall portions 20 below said nut N merging with outwardly directed hooks 22, or the like, which are of a reduced width corresponding substantially to the width of the panel opening 1 so as to be readily received therein. In the normal untensioned relation of said spring arms 14, said hooks 22 are spaced apart a distance greater than the length of the panel opening 1 and are provided in a predetermined spacing from the bottom wall portions 20 corresponding substantially to the thickness of the panel P adjacent the panel opening 1 so as to cooperate with said bottom wall portions 20 in clasping marginal portions of said panel opening 1 in frictional engagement therewith. The spring arms 14, otherwise, extend from the central body portion 11 in entirely free and independent relation so that they may be readily flexed as necessary for an easy and quick initial attachment of the hooks 22 with the marginal portions of said panel opening 1, as shown in Fig. 3.

In the general form of holder 10, thus provided, the spring arms 14 may be spread apart as necessary to slip the nut N through the space between the hooks 22 on the ends thereof to a position in which the holder retains the nut N in the manner of a cage device defined by said spring arms 14, the side tabs or lugs 16 and the bottom wall portions 20, with the threaded opening in the nut N in line with the enlarged bolt passage 12 in the central body portion 11 of the holder.

The spring arms 14 have the walls thereof stamped to provide locking elements in the form of resilient fingers 30, or the like, extending generally lengthwise of said arms 14. The fingers 30 are provided with one or preferably two wing portions 32 of less length than said fingers 30, and said wing portions 32 are bent inwardly so that their longitudinal edges define guide surfaces leading to shoulders 34 on the ends of said wing portions 32. The shoulders 34 project inwardly from the walls of said arms 14 and are provided on said fingers 30 at predetermined locations as necessary to engage the top of the nut N in its applied fastening position in the work opening 1, as shown in Fig. 4. The lower free ends of said fingers 30 define abutments 36 between said shoulders 34 and these abutments 36 are adapted to engage the sides of the nut N in cooperation with said shoulders 34 engaging the top of the nut N in said applied fastening position of the nut N, as shown in Fig. 4.

The nut N has a generally T-shaped vertical cross section through the length thereof and comprises a body portion 40 merging with a larger collar or work clamping portion 45 defined by laterally extending flanges 46. Said body portion 40 of the nut is substantially square in horizontal cross section and is adapted to enter into the panel opening 1 between the previously attached hooks 22 of the holder 10 as shown in Fig. 4, and this is facilitated by bevels 41 formed on lower corners of said body portion 40. While the enlarged collar or work clamping portion 45 on the upper part of the nut N is shown comprising a pair of laterally extending flanges 46, such a nut may be provided with similar flanges on all four sides thereof, if desired. In the present example, said nut N is provided with two laterally extending flanges 46 at the ends thereof which overlap the panel opening 1 and prevent said nut N from being disengaged from the panel P in one direction. Disengagement in the other direction is prevented by the locking shoulders 34 on the fingers 30 of the holder 10 in a manner whereby said shoulders 34 engage the top of said nut N in the applied fastening position thereof as seen in Fig. 4. Preferably, the flange portions 46 of the nut N have their outer faces 47 tapered inwardly to provide suitable clearance for inward flexing of the spring arms 14 in the initial attachment of the hooks 22 thereon in the panel opening 1.

The assembled nut and nut holder, Fig. 1, accordingly is adapted to be easily and quickly attached in the panel opening 1 simply by compressing the spring arms 14 to move the hooks 22 on the ends thereof inwardly toward each other. In this relation, to obtain the required inward flexing of the arms 14, the nut N is held adjacent the base 11 of the holder by said arms gripping the upper corners of the flanges 46 of said nut, or by the engagement of said flanges 46 with the edges of the wings 32 projecting within said holder. When the spring arms 14 are compressed, the hooks 22 still have their extremities farther apart than the length of the panel opening 1. Consequently, in attaching the nut holder 10, one hook 22 is passed through the opening 1 with the other hook 22 resting on the surface of the panel adjacent said opening 1. The resilience of the spring arms 14 and the clearance thereof from the inwardly tapered end faces 47 of the nut N enables the latter hook 22 to be pressed inwardly and sprung sufficiently so that it may also be received in said opening 1. The spring arms 14 are then released from their compressed condition and in attempting to assume their normal untensioned relation, both hooks 22 spread apart and engage the adjacent marginal edges of the panel opening 1, as shown in Figs. 2 and 3, to retain the nut and nut holder 10 in initially attached position. The spring arms 14, as thus initially attached, do not assume their normal untensioned relation but rather, remain biased slightly inwardly in the engaged position of the hooks 22 in the panel opening 1, and thereby retain the nut N and, more particularly, the flanges 46 of said nut in spaced relation to the panel P by gripping engagement of said spring arms 14 with the upper corners of said flanges 46 on the nut N, or in a slightly lower position by engagement of the edges of the wings 32 on the fingers 30 of the holder with said flanges 46 on the nut.

In such initially attached position of the fatsening device 10, the body portion 40 of said nut is substantially in line with the space between the hooks 22 and the panel opening 1, whereupon a suitable tool T is applied through the passage 12 in the base 11 of the holder into engagement with the top of the nut N, as illustrated in broken lines in Figs. 2 and 3. A suitable force on the tool T causes the nut N to move to its fully attached fastening position shown in Fig. 4 in which the body portion 40 of said nut is wedged between the adjacent inner surfaces of the hooks 22 to force said hooks outwardly from the position shown in Fig. 3 to that of Fig. 4. The bevels 41 on said body portion 40 of the nut define pilot surfaces which produce a gradual outward camming of said hooks 22 leading to a ready drive fit of the body portion 40 of said nut N between said hooks 22 in the fully attached position of said nut N, as shown in Fig. 4. The flanges 46 of the nut N in such fully attachced position, are seated in bearing engagement on the bottom wall portions 20 of the holder and, more particularly, in bearing relation with the work or panel P adjacent the panel opening 1.

As the nut N is actuated by the tool T from the position shown in Fig. 3, the inwardly tapered end faces 47 on the flanges 46 of said nut N slide on the guide surfaces defined by the edges of the wings 32 to cause said wings 32 and the fingers 30 to flex outwardly as necessary to permit said flanges 46 of the nut N to pass over said shoulders 34 to the fully attached position of the nut as shown in Fig. 4. The fingers 30 and said shoulders 34 thereupon spring inwardly in attempting to assume their normal untensioned relation in a manner whereby said shoulders 34 snap into positive engagement with the top of the nut N, as shown in Fig. 4. The abutments 36 on the ends of said spring fingers 30 engage the adjacent outer faces 47 of the flanges 46 of the nut N to rigidify the positive engagement of said shoulders 34 with the top of said nut N. The shoulders 34, accordingly, provide a positive permanent lock of the nut N in its attached fastening position against displacement by any likely force which might otherwise cause dislocation or removal thereof from such attached position, as, for example, when subjected to a severe impact taking place in the use of a power tool for applying the associated bolt to said nut N.

As shown in Fig. 6, the improved holder 10 is equally adaptable to use as a retainer for a bolt B having a head approximating the size and proportions of the nut which is used as disclosed with reference to Figs. 1–5, inclusive. The head of the bolt B has a similar body portion 50 merging with a larger collar or work clamping portion 55 and said body portion 50 is adapted to enter into the panel opening 1 between the previously attached hooks 22 of said holder 10, with this action being facilitated by bevels 51 formed on the lower corners of said body portion 50. The collar or work clamping portion 55 comprises a pair of laterally extending flanges 56 having tapered end faces 57 which provide suitable clearance for inward flexing of the spring arms 14 of the holder 10 in the initial attachment thereof in the panel opening 1. The head of the bolt B, thus provided, is readily assembled in the holder 10 between the spring arms 14 and this assembly, accordingly, easily and quickly secured in the panel opening 1, as shown in Fig. 6, in the same general procedure described with reference to Figs. 1–5, inclusive, with a suitable tool being employed to force the bolt head to its fully attached fastening position in which the shoulders 34 on the fingers 30 engage the top of the bolt head to provide a positive permanent lock of said bolt B in such fastening position against displacement or removal.

A holder or retainer in accordance with the invention preferably is constructed of relatively thin sheet metal the thickness of which is selected according to service requirements and the predetermined size of the parts to be secured. The holder or retainer is most effective when provided of spring metal suitably tempered and otherwise treated to give the desired toughness and hardness, particularly in the case of devices intended for use in heavy duty applications. A cheap and highly satisfactory holder or retainer in accordance with the invention may be provided from cold rolled metal such as cold rolled steel which is untempered but of a spring metal nature and capable of providing an effective reliable fastening device as and for the purposes described.

While the invention has been described in detail with specific examples, such examples are intended as illustrations only inasmuch as the invention fully contemplates various modifications which may be provided without departing from the spirit and scope of the invention.

What is claimed is:

1. A fastening device comprising a nut or bolt head, and a holder for attaching said nut or bolt head in a work opening, said nut or bolt head including a body portion having a laterally extending flange on the upper portion thereof to render said upper portion impassable through said opening, said holder comprising a piece of sheet metal bent to provide a base extending across the top of the nut or bolt head, resilient arms extending from said base at opposite ends of the nut or bolt head and provided with attaching elements, said attaching elements being receivable in said work opening to secure the fastening device in initially attached position with said nut or bolt head in spaced relation to the work, said body portion being transversely dimensioned for insertion into said opening and between said attaching elements to expand the same into anchored relation in the opening, said nut or bolt head being movable axially in the holder from said initially attached position in spaced relation to the work to engagement with said attaching elements to position the same in bearing relation with the work in the fully attached position of the fastening device, and at least one of said arms of the holder comprising a partially severed area providing an integral element having a free end extending away from said base and defining inwardly extending means spaced from said attaching elements to allow said flange to be tightly interposed therebetween when the nut or bolt head is disposed in the fully attached position, said means being adapted to engage the nut or bolt head in such fully attached position to retain the same against displacement from said fully attached position.

2. A fastening device comprising a nut or bolt head, and a holder for attaching said nut or bolt head in a work opening, said nut or bolt head including a body portion having a laterally extending flange on the upper portion thereof to render said upper portion impassable through said opening, said holder comprising a piece of sheet metal bent to provide a base extending across the top of the nut or bolt head, resilient arms extending from said base at opposite ends of the nut or bolt head and provided with attaching elements receivable in said work opening to secure the fastening device in initially attached position, means included in said holder for retaining the nut or bolt head in spaced relation to the work in such initially attached position, said body portion being transversely dimensioned for insertion into said opening and between said attaching elements to expand the same into anchored relation in said opening, said nut or bolt head being movable axially in said holder from said initially attached position in spaced relation to the work to engagement with said attaching elements to position the same in bearing relation with the work in the fully attached position of the fastening device, each of said arms of the holder comprising a partially severed area providing an integral element having a free end extending away from said base and defining an inwardly extending shoulder spaced from said respective attaching element to allow said flange to be tightly interposed therebetween when the nut or bolt head is disposed in the fully attached position, each of said shoulders being adapted to engage the nut or bolt head in such fully attached position to retain the same against displacement from said fully attached position.

3. A fastening device comprising a nut or bolt head, and a holder for attaching said nut or bolt head in a work opening, said nut or bolt head including a body portion having a laterally extending flange on the upper portion thereof to render said upper portion impassable through said opening, said holder comprising a piece of sheet metal bent to provide a base extending across the top of the nut or bolt head, resilient arms extending from said base at opposite ends of the nut or bolt head and provided with attaching elements receivable in said work opening to secure the fastening device in initially attached position, said arms of the holder comprising partially severed areas defining integral fingers having free ends extending away from said base, said fingers including inwardly bent wings adapted for retaining the nut or bolt head in spaced relation to the work in such initially attached position, said body portion being transversely dimensioned for insertion into said opening and between said attaching elements to expand the same into anchored relation in the opening, said nut or bolt head being movable axially in said holder from said initially attached position in spaced relation to the work to engagement with said attaching elements to position the same in bearing relation with the work in the fully attached position of the fastening device, said inwardly bent wings defining shoulders spaced from said attaching elements to allow said flange to be tightly interposed therebetween when the nut or bolt head is disposed in the fully attached position, each of said shoulders being adapted to engage the nut or bolt head in such fully attached position to retain the same against displacement from said fully attached position.

4. A fastening device comprising a nut or bolt head, and a holder for attaching said nut or bolt head in a work opening, said nut or bolt head including a body portion having a laterally extending flange on the upper portion thereof to render said upper portion impassable through said opening, said holder comprising a piece of sheet metal bent to provide a base extending across the top of the nut or bolt head, resilient arms extending from said base at opposite ends of the nut or bolt head and provided with outwardly directed hooks receivable in said work opening to secure the fastening device in initially attached position, each of said arms of the holder comprising a partially severed area defining an integral finger having a free end extending away from said base, each of said fingers having inwardly bent wings defining means for retaining the nut or bolt head in spaced relation to the work in such initially attached position, said body portion being transversely dimensioned for insertion into said opening and between said hooks to expand the same into anchored relation in the opening, said nut or bolt head being movable axially in said holder from said initially attached position in spaced relation to the work to engagement with said hooks to position the same in bearing relation with the work in the fully attached position of the fastening device, and the ends of said wings defining shoulders spaced from said hooks respectively to allow said flange to be tightly interposed therebetween when the nut or bolt head is disposed in the fully attached position, said shoulders being adapted to engage the top of the nut or bolt head in such fully attached position to retain the same against displacement from said fully attached position.

5. A fastening device comprising a nut or bolt head, and a holder for attaching said nut or bolt head in a work opening, said nut or bolt head comprising a body portion and a laterally projecting flange disposed on the upper portion of said body portion to render the upper portion impassable through said opening, and said holder comprising a piece of sheet metal bent to provide a base extending across the top of the nut or bolt head, resilient arms extending from said base at opposite ends of the nut or bolt head and provided with attaching elements receivable in said work opening to secure the fastening device in initially attached position, means included in said holder for retaining the nut or bolt head in said initially attached position with said flanges on the nut or bolt head in spaced relation to the work, said body portion being transversely dimensioned for insertion into said opening and between said attaching elements to expand the same into anchored relation in the opening, said nut or bolt head being movable axially in said holder from said initially attached position to fully attached position in which said flanges on the nut or bolt head are in engagement with said attaching elements thereby positioning the same in bearing relation with the work and said body portion of the nut or bolt head is received in said work opening in wedging relation between said attaching elements of the holder, and each of said arms of the holder comprising a partially severed area providing an integral element having a free end extending away from said base and defininig an inwardly extending shoulder spaced from said respective attaching element to allow said flange to be tightly interposed therebetween when the nut or bolt head is disposed in the fully attached position, each of said shoulders being adapted to enage the nut or bolt head in said fully attached position to retain the same against displacement from said fully attached position.

6. A fastening device comprising a nut or bolt head, and a holder for attaching said nut or bolt head in a work opening, said nut or bolt head comprising a body portion and laterally projecting flanges disposed on the upper portion of said body portion to render the upper portion impassable through said opening, and said holder comprising a piece of sheet metal bent to provide a base extending across the top of the nut or bolt head, resilient arms extending from said base at opposite ends of the nut or bolt head and provided with outwardly directed hooks receivable in said work opening to secure the fastening device in initially attached position, each of said arms of the holder comprising a partially severed area defining an integral finger having a free end extending away from said base, each of said fingers having inwardly bent wings defining means for retaining the nut or bolt head in said initially attached position with said flanges thereon in spaced relation to the work, said body portion being transversely dimensioned for insertion into said opening and between said hooks to expand the same into anchored relation in the opening, said nut or bolt head being movable axially in said holder from said initially attached position to fully attached position in which said flanges on the nut or bolt head are in engagement with said hooks thereby positioning the same in bearing relation with the work and said body portion of the nut or bolt head is received in said work opening between said hooks to expand said hooks in anchored relation in the work opening, and the ends of said wings defining shoulders spaced from said hooks respectively to allow said flanges to be tightly interposed therebetween when the nut or bolt head is disposed in the fully attached position, said shoulders being adapted to engage the nut or bolt head in said fully attached position to retain the same against displacement from said fully attached position.

7. A fastening device comprising a nut or bolt head, and a holder for attaching said nut or bolt head in a work opening, said nut or bolt head comprising a body portion and laterally projecting flanges at opposite ends of the upper portion of said nut or bolt head which render said upper portion impassable through said opening, and said holder comprising a piece of sheet metal bent to provide a base extending across the top of the nut or bolt head, resilient arms extending from said base of the holder over the end faces of said flanges on the nut or bolt head and provided with outwardly directed hooks receivable in said work opening to secure the fastening device in initially attached position, each of said arms of the holder comprising a partially severed area defining an integral finger having a free end extending away from said base, each of said fingers having an abutment on its free end intermediate a pair of inwardly bent wings defining means for retaining the nut or bolt head in said initially attached position with said flanges thereon in spaced relation to the work, said body portion being transversely dimensioned for insertion into said opening and between said hooks to expand the same into anchored relation in the opening, said nut or bolt head being movable axially in said holder from said initially attached position to fully attached position in which said flanges on the nut or bolt head are in engagement with said hooks thereby positioning the same in bearing relation with the work and said body portion of the nut or bolt head is received in said work opening between said hooks to expand said hooks in anchored relation in the work opening, the ends of said wings defining shoulders spaced from said hooks respectively to allow said flanges to be tightly interposed therebetween when the nut or bolt head is disposed in the fully attached position, said shoulders being adapted to engage the top surfaces of said flanges on the nut or bolt head with said abutments adapted to engage the end faces of said flanges on the nut or bolt head in said fully attached position to retain the same against displacement from said fully attached position.

References Cited in the file of this patent

UNITED STATES PATENTS

| | | |
|---|---|---|
| 1,742,131 | Carr | Dec. 31, 1929 |
| 1,768,505 | Carr | June 24, 1930 |
| 2,404,372 | Hallock | July 23, 1946 |
| 2,495,037 | Tinnerman | Jan. 17, 1950 |
| 2,635,666 | Murphy | Apr. 21, 1953 |
| 2,779,377 | Flora | Jan. 29, 1957 |

FOREIGN PATENTS

| | | |
|---|---|---|
| 495,976 | Great Britain | Nov. 23, 1938 |